United States Patent

[11] 3,631,946

| [72] | Inventor | Albert Grosseau<br>Paris, France |
|---|---|---|
| [21] | Appl. No. | 29,880 |
| [22] | Filed | Apr. 20, 1970 |
| [45] | Patented | Jan. 4, 1972 |
| [73] | Assignee | Societe Anonyme Automobiles Citroen<br>Paris, France |
| [32] | Priority | Apr. 28, 1969 |
| [33] | | France |
| [31] | | 6913438 |

[54] TRANSMISSION AND CLUTCH WITH MANUAL PULSE SWITCH
6 Claims, 3 Drawing Figs.

[52] U.S. Cl. ............................................. 192/3.58,
74/471 XY, 200/61.88
[51] Int. Cl. .......................................... F16d 67/00,
B60k 21/00
[50] Field of Search .................................. 200/61.88,
61.91; 192/3.58, 3.57, 3.59; 74/471 XY

[56] References Cited
UNITED STATES PATENTS

| 2,841,659 | 7/1958 | Eitel | 74/471 XY |
| 2,945,100 | 7/1960 | Maurice et al. | 192/3.58 |
| 3,223,792 | 12/1965 | Strother | 74/471 XY |
| 3,298,483 | 1/1967 | Morrison | 192/3.58 |
| 3,360,620 | 12/1967 | Ward | 74/471 XY |
| 3,422,939 | 1/1969 | Biabaud | 192/3.57 |

*Primary Examiner*—Benjamin W. Wyche
*Attorney*—Wenderoth, Lind & Ponack

ABSTRACT: This pulse control system applicable notably to change-speed transmission mechanism of motor vehicles comprises in a case a selector lever formed with an axial bore in which a rod extension of the gearshift control lever proper is adapted to slide, a spring constantly urging the selector lever to its inoperative position, contact means adapted to close circuits for delivering control pulses to the coils of relays coacting with members actuating in turn the change-speed servomechanisms, and said contacts being disposed in a transverse plane and actuatable by the free end of said selector lever driven during the radial movements of said control lever, and so-called neutral contact actuatable by an axial movement of the rod extension of said control lever for opening the relay-energizing circuit.

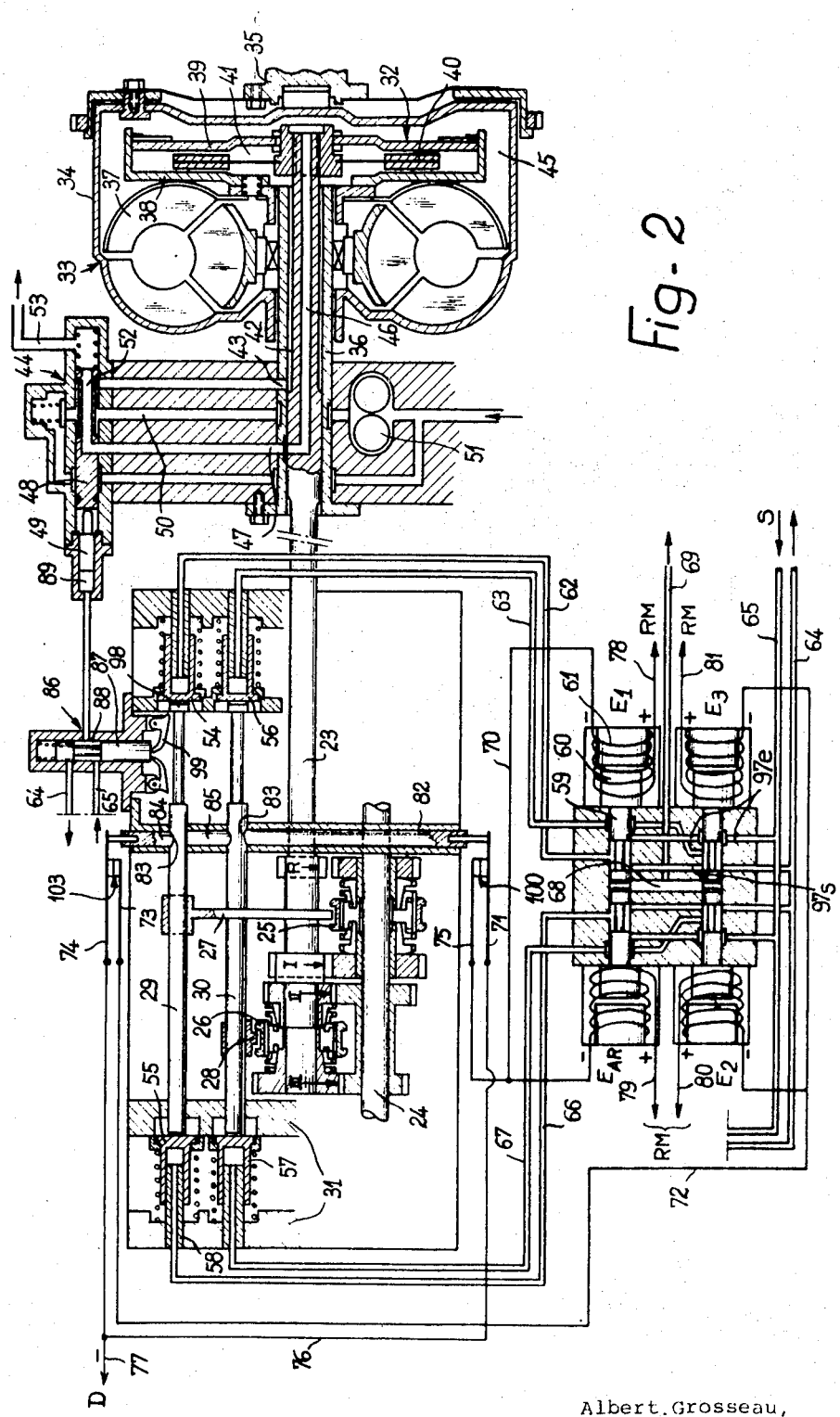

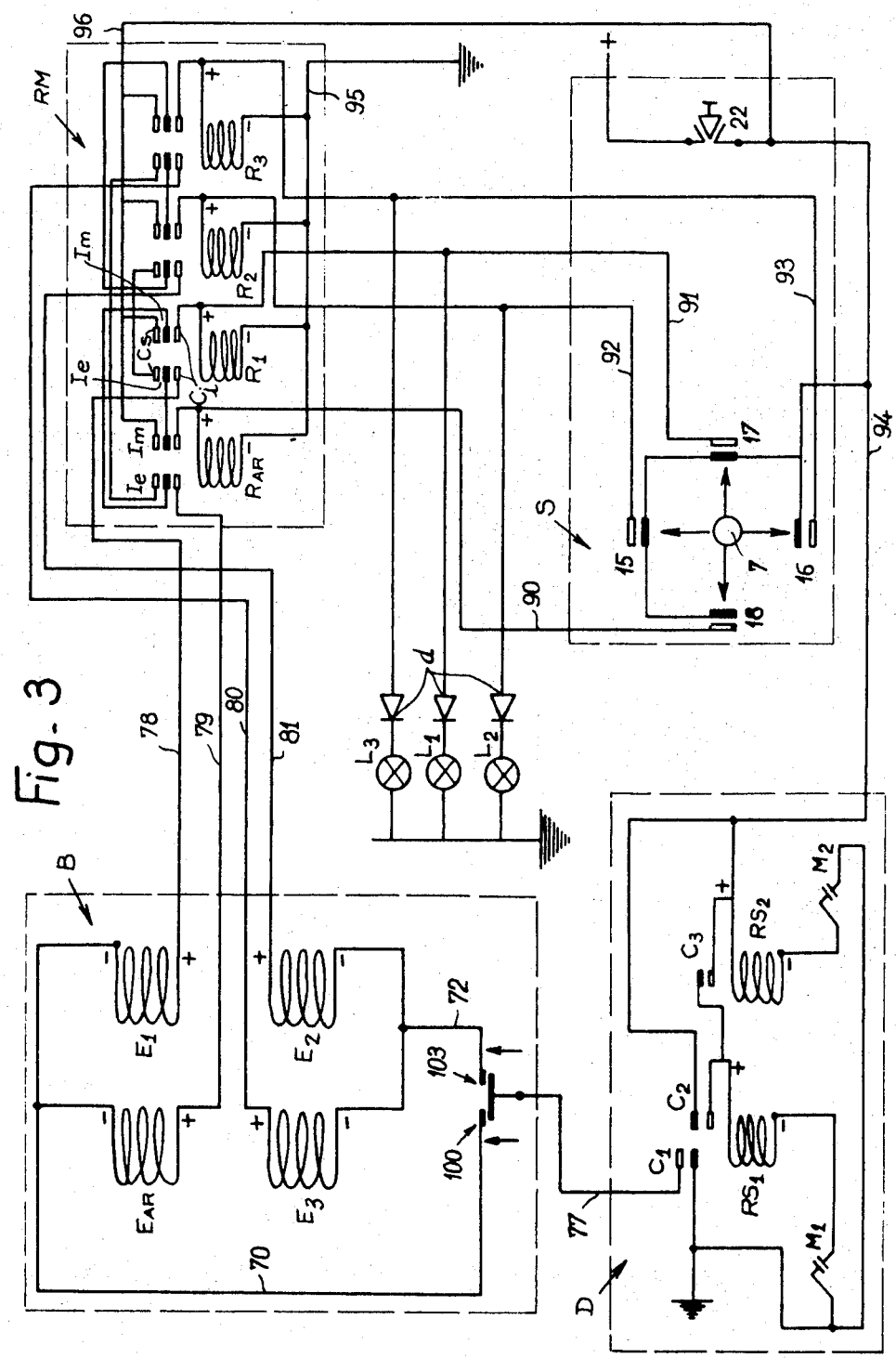

TRANSMISSION AND CLUTCH WITH MANUAL PULSE SWITCH

The present invention relates to electric pulse control systems applicable notably to change-speed transmission mechanisms of motor vehicles.

Device for controlling transmission mechanisms such as change-speed gears and the like by means of electric pulses are already known, whereby the gear selection is obtained as a rule by means of a control lever moving in the opposite senses of a same direction and capable of delivering only two orders, i.e. one for changing up and another for changing down along the speed range. The driver is informed of the momentary condition of the transmission only by an electrical or machinical indicator on the instrument panel of the vehicle.

Thus, for instance, with the known arrangements when it is desired to change down from third or top speed to first or low speed, two successive change-down orders must be issued so as to change firstly from third to second gear and then from second to first or low gear. Before making the gear change, the driver must check on the aforesaid indicator the momentary condition of the system in order to be fully aware of the sense and number of the orders to be issued.

It is the object of the present invention to provide an electrical pulse control system wherein the selector member permits of transmitting orders to a change-speed mechanism by a very simple control action of the driver, whereby the latter can control the desired gear ratio by means of a single movement requiring but a minimum effort without having to refer to the preceding condition or position, this movement being inherent to the controlled condition and differing for each possible condition of the transmission mechanism. This system is also adapted to be associated, if desired with means for displaying or indicating the resulting condition.

The pulse control system according to this invention, which comprises a selector lever having a control or gearshift lever associated with a resilient member for constantly urging said selector lever to its inoperative position, for controlling relay means actuating in turn members of gear-change servomechanisms of a transmission mechanism or gearbox, is characterized essentially in that it comprises in the inner space of a selector lever case a rod extension of the selector control lever adapted to slide in axial translation, the two levers aforesaid being rigid with each other during all the other movements of the selector lever; a suitable spring urging the selector lever to an intermediate position of equilibrium; contact means for closing circuits adapted to deliver control pulses for energizing said relay means, said contact means being disposed in at least one transverse plane perpendicular to the longitudinal axis of the selector device and responsive to the free end of said selector lever to which only low-amplitude movements are imparted as a consequence of the guided movements of the selector control lever towards radial positions determining the desired transmission condition; and a neutral contact actuatable only through an axial movement of the rod extension of said control lever for opening the energizing circuits of aid relay means.

The control system according to this invention is advantageously applicable to a servo-controlled or power-assisted change-speed mechanism of the type described and illustrated in the U.S. Pat. No. 3,422,939.

Other features of this invention will appear as the following description proceeds with reference to the attached drawing illustrating diagrammatically by way of example a typical form of embodiment of the pulse control system. In the drawing;

FIG 2 illustrates diagrammatically a transmission mechanism for motor vehicle, of the type described in the aforesaid patent, equipped with the pulse control system of this invention, and FIG. 3 is a wiring diagram of the pulse control system in the case of its application to the transmission mechanism of FIG. 2.

Figure 1:
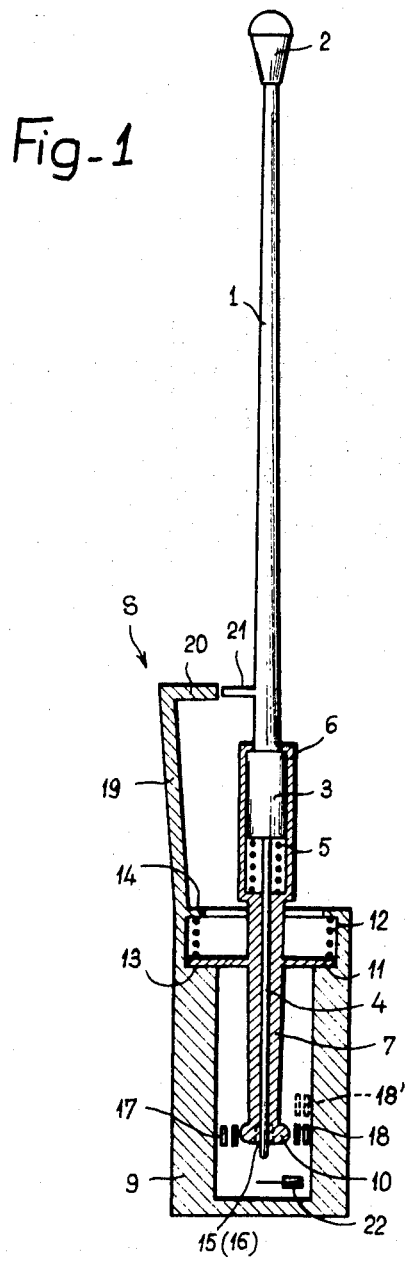
FIG. 1 is a longitudinal section taken along the pulse control selector device.

Referring first to FIG. 1, it will be seen that the pulse selector S constituting the essential component element of the pulse control system according to this invention illustrated diagrammatically in FIG. 3 comprises a control lever or gear shift lever 1 having a handle or knob 2. This lever 1 has an integral portion 3 constituting a cylindrical piston having an extension in the form of a relatively thin rod 4. This piston 3 is adapted to slide against the force of a return spring 5 in a cylinder 6 formed integrally with a selector lever 7 housed in a cylindrical chamber 8 of a case 9. The rod extension 4 can slide freely in an axial bore formed in the selector lever 7.

The selector lever has formed on its free end an annular bead or like projection 10 and in the vicinity of cylinder 6 a flange 11 bearing with the assistance of a spring 12 against an inner shoulder 13 of case 9; an inner annular portion 14 of this case 9 keeps the spring 12 in its prestressed state. In the inoperative condition, the axis of selector lever 7 is coincident with that of case 9 and spring 12 normally keeps the selector assembly in a position of equilibrium in relation to said case 9.

Secured to the lower portion of the inner wall of case 9, in a transverse plane registering with the inoperative position of bead 10 of selector lever 7 and perpendicularly to the longitudinal axis of this lever, also in the inoperative position thereof, are four front contacts 15, 16, 17 and 18 disposed by pairs on orthogonal diameters. Each contact is closed by a suitable radial movement of the control lever 1 of the selector which is rigid with the selector lever 7 in all the movements thereof except its axial movements of translation, due to the action of spring 5 holding these levers in a same relative position when no axial thrust is exerted against the control lever 1. Each contact is inserted in a circuit controlling by pulses a predetermined gear ratio of the transmission mechanism, as explained herein after in detail. Thus, for example, contacts 15 and 16 correspond to the control or engagement of second (intermediate) and third (high) gear respectively, and contacts 17, 18 to the control or engagement of first (low) gear and reverse, respectively. The selector control lever 1 guided by conventional means such as a selector grid (not shown) may be moved to four radial positions corresponding, for example, to three forward speeds and reverse. The line connecting the ends of lever 1 in second and third gears is preferably perpendicular to the steering column of the vehicle in order to reproduce the usual movements of the hand in the case of a conventional change-speed lever.

The radial movement of control lever 1 is attended by a pivotal movement of selector lever 7 about a peripheral point lying on the same side of flange 11, so as to move the annular bead 10 thereof in the opposite direction and cause same to engage the contact corresponding to the desired speed. When the control lever 1 is released, it is returned together with the selector lever 7 to the inoperative position.

A safety device is provided on the selector for differentiating the control movement necessary for engaging the reverse. To this end, the wall of case 9 comprises a lateral longitudinal extension 19 beyond the cylinder 6 enclosing the selector lever 7, this extension comprising at its outer end an in-turned projection 20 registering, in the inoperative position of control lever 1, with a pin 21 carried by control lever 1. Thus, in the example illustrated in FIG. 1, the driver cannot move the control lever 1 to the reverse position unless he has previously pulled this lever with a force depending on that of spring 12, this pull being maintained during the radial movement of the lever which is necessary for causing the bead 10 to engage the reverse gear contact 18.

Since the control lever 1 and selector lever 7 are rigid with each other during any radial movements, it is also possible to provide a projection on the inner wall of case 9, for engagement with a registering pin 21 carried by selector lever 7.

The same safety catch effect may be obtained by simply shifting the reverse gear contact 18 to position 18′, as shown in dash lines. Alternately, the two arrangements may be combined together notably in the case of a transmission mechanism providing four forward speeds and reverse.

Another back contact 22 constituting the neutral contact is provided at the bottom of the chamber 8 of case 9. This contact is actuated through the rod extension 4 of control lever 1 by exerting an axial thrust on this lever against the resistance of spring 5. When lever 1 is released the rod 4 resumes of course its inoperative position and contact 2 is reclosed.

The pulse control system according to this invention is applicable for example to the transmission mechanism B described in detail in the aforesaid patent, and illustrated diagrammatically in FIG. 2.

This transmission mechanism comprises input and output shafts 23 and 24 respectively, which carry four sets of gears I, II, III and R corresponding to first (low), second (intermediate) and third (high) speeds, and reverse, respectively.

Each set of gears comprises an idle gear adapted to be rotatably coupled to its supporting shaft by means of a sliding hub denoted 25 in the case of gears I and R, and 26 in the case of gears II and III. These sliding hubs 25 and 26 are actuated through the medium of a pair of forks 27 and 28 mounted the former on a bar 29 and the latter on another bar 30, both bars 29, 30 being slidably mounted in the end cover of the gear case, shown diagrammatically at 31.

The input shaft 23 of the transmission mechanism is coupled to a friction clutch 32 incorporated in a torque converter 33 having its impeller casing 34 connected to the input or engine shaft 35 and adapted to revolve on a fixed hollow hub 36 engaged by the shaft 23. The turbine 37 of this torque converter is connected to the clutch bell-shaped member 38 receiving a movable plate 39 for clamping or releasing a clutch friction disk 40 rigid with shaft 23. A clutch chamber 41 communicates via an annular passage 42 provided between shaft 23 and hub 36 with another passage 43 formed in said hub, which is connected in turn to a distributor 44 of compressed fluid. A chamber 45 of torque converter 33 communicates through an axial duct 46 formed in shaft 23 with a radial duct 47 formed in hub 36 and leading to the aforesaid distributor 44.

The distributor 44 comprises a sliding spool valve 48 responsive to a control piston 49 adapted to be driven by compressed fluid. This distributor 44 is connected via a duct 50 to the delivery side of a pump 51 connected to a fluid reservoir (not shown) so as to supply compressed fluid either to chamber 41 of clutch 32, which corresponds to the clutch releases position, or to chamber 45 of torque converter 33, which corresponds to the clutch engagement. An inner passage 52 formed in the spool valve 48 permits the exhaust of chamber 45 through duct 53.

The sliding bars 29, 30 carrying the forks 27, 28 associated with sliding hubs 25, 26 have their ends drivingly engaged by control pistons; thus, bar 29 is responsive to pistons 54 and 55, and bar 30 to pistons 56, 57. These pistons 54 to 57 are hollow and slidably mounted on fixed guide pipes 58 supplying fluid under pressure. This supply takes place under the control of solenoid-operated valves $E_1$, $E_2$, $E_3$ and $E_{AR}$ corresponding to the first, second and third forward speeds and to the reverse, respectively.

Each solenoid-operated valve comprises a spool 59 rigid with the core of an electromagnet 60 having a coil winding 61. The spools 59 of solenoid-operated valves $E_1$ and $E_3$ communicate via ducts 62 and 63 with pistons 54 and 56, respectively, and are adapted to communicate either with a general exhaust line 64 or with a general supply line 65 adapted to deliver fluid under pressure in the direction of an arrow S from a suitable source (not shown). Similarly, spools 59 of solenoid-operated valves $E_{AR}$ and $E_2$ communicate via ducts 66 and 67 with pistons 55 and 57, respectively, and can communicate either with the general exhaust line 64 or with the supply line 65 delivering fluid under pressure. A leakage collector duct 68 connects the solenoid-operated valves via a return line 69 to a main reservoir (not shown) to which the exhaust line 64 is also connected.

The negative terminal, for example, of solenoid-operated valves $E_1$ and $E_{AR}$, are both connected via a conductor 70 to the fixed stud 71 of a contact 100, and the corresponding terminals of the coils of solenoid-operated valves $E_2$ and $E_3$ are both connected via a conductor 72 to the fixed stud 73 of a contact 103. The movable contact blades 74 and 75 of these contacts are interconnected through a conductor 76 and the latter is grounded via another conductor 77 through a safety device D to be described presently. The positive terminals of solenoid-operated valves $E_1$, $E_{AR}$, $E_2$ and $E_3$ are connected through respective conductors 78, 79, 80 and 81 to a holding relay assembly RM also to be described presently.

A sliding control rod 82 coacts with the movable blade 74 of contact 100 and is associated with the sliding bar 30 formed with a groove 83 acting as a control cam to said rod 82. Contact 100 is closable only in the neutral position of bar 30. Similarly, another control rod 84 coacts with the movable blade 74 of contact 103 and is associated with the other sliding bar 29 in which a groove 83 constitutes another cam means for actuating said rod 29. Contact 103 can close only in the neutral position of bar 29. A mechanical locking member 85 coacting with both grooves 83 prevents the two bars from being moved simultaneously to a gear-engaging position, and permits the engagement of one bar only if the other is in neutral.

The sliding bars 29 and 30 are adapted, during their movements, to actuate a hydraulic relay device 86 controlling the action of control piston 49 of distributor 44. This relay comprises a spool 87 formed with a groove 88 communicating permanently with the chamber 89 of piston 49; this relay can communicated either with line 65 delivering the fluid under pressure, which corresponds to the clutch release condition, or with exhaust line 64, which corresponds to the clutch-engaging condition.

In the position illustrated in the drawing, the forks 27 and 28 are in their neutral positions and the clutch is released.

As illustrated in the wiring diagram of FIG. 3, the assembly RM connected to the solenoid-operated valves comprises the holding relays $R_{AR}$, $R_1$, $R_2$ and $R_3$ associated with solenoid-operated valves $E_{AR}$, $E_1$, $E_2$ and $E_3$, respectively, and are controlled by the pulse selector S. Each relay-holding relay comprises a set of reversing contacts, of which one $I_e$ is adapted to supply energizing current to the coil of the corresponding solenoid-operated valve, the other set $I_m$ being adapted to hold the relay each time a pulse received from the selector is ended.

To this end, the fixed stud of each contact 15, 16, 17 and 18 of selector S is connected via one of conductors 90, 91, 92 and 93 respectively to a fixed contact $C_t$ of the corresponding reversing switch $I_m$.

The movable blades of the selector contacts are connected via a conductor 94 to the neutral contact 22 of selector S, which is connected to the positive terminal of the source of current having its negative terminal grounded. Contact 22 is closed in the operative condition of the device. The negative terminals of the holding relay coils are grounded via a conductor 95.

The fixed contacts $C_s$ of reversing switches $I_m$ of said relays are connected via a conductor 96 and the neutral contact 22 of selector S to the positive terminal + of the source of current. The contacts $C_2$ of reversing switches $I_e$ of relays RM are interconnected by pairs: the contact of relay $R_{AR}$ is connected to the corresponding contact of relay $R_3$, and that of relay $R_1$ is connected to the corresponding contact of relay $R_2$. Contacts $C_t$ of reversing switches $I_e$ of said relays are connected through conductors 78 to 81 respectively to one terminal of the coil of the corresponding solenoid-operated valve.

The blades of reversing switches $I_e$ and $I_m$ are also interconnected by pairs. Thus, the blade of reversing switch $I_e$ of relay $R_{RAR}$ is connected to the blade of reversing switch $I_m$ of relay $R_1$; the blade of reversing switch $I_e$ of relay $R_2$ is connected to the blade of reversing switch $I_m$ of relay $R_3$, and finally the blade of reversing switch $I_e$ of relay $R_3$ is connected to the blade of reversing switch $I_m$ of relay $R_2$.

The clutch safety device D comprises two relays $RS_1$ and $RS_2$ adapted to be energized through the contact of corresponding pressurepresponsive switches $M_1$ and $M_2$ which ground the negative terminals of the coils of these relays. Relays $RS_1$ comprises two contacts $C_1$ and $C_2$; the first contact $C_1$ is a back contact and its fixed stud is connected via conductor 77 to the movable blades of contacts 100 and 103 of the solenoid-operated valves E of the transmission mechanism B, and its movable blade is grounded. The second contact $C_2$ is a front contact for holding the relay $RS_1$, through its movable blade to the positive terminal via conductor 94, and through its fixed stud to the energizing terminal + of the coil of relay $RS_1$. Relay $RS_2$ comprises a single front contact $C_3$ for energizing the coil of relay $RS_1$; this contact is connected through its movable blade to the fixed stud of $C_2$ and through its fixed stud to conductor 94 and to the positive energizing terminal relay $RS_2$. The pressure-responsive switches $M_1$ and $M_2$ receive the former the clutch release pressure prevailing in chamber 41 and the latter the control pressure prevailing in chamber 89 of piston 49 controlling the clutch distributor 44.

The contact of the pressure-responsive switch $M_1$ remains open as long as the fluid pressure in chamber 41 exceeds 4.2 bars (61 p.s.i.) i.e. the minimum pressure necessary for producing the clutch release. This condition is sufficient to prevent the relay $RS_1$ from being energized and therefore to close the grounding contact $C_1$ of the coils of the solenoid-operated valves. The contact of pressure-responsive switch $M_2$ is closed when the clutch control fluid pressure in chamber 89 of piston 49 is at least 10 bars (145 p.s.i.), the clutch release control action being produced only at that pressure; then, relay $RS_2$ is deenergized and its closed contact $C_3$ energizes the relay $RS_1$. Thus, this relay $RS_1$ is energized and contact $C_1$ remains open as long as the fluid pressure in chamber 41 is less than 4.2 bars (61 p.s.i.).

This control action is completed by the display of the demanded gear ratio, for example by means of light signals $L_1$, $L_2$, $L_3$ connected on one side to the corresponding contact of selector S, respectively, and on the other side to the ground. A diode $d$ is interposed in the circuit of each lamp to prevent the simultaneous lighting of two lamps when changing from one speed to another, as this would also delay the deenergization of the relay which it is desired to cut out.

The control system operates as follows:

Assuming that the engine is running and the vehicle stationary, when the contact corresponding to the desired speed is actuated by means of selector S, for example for engaging the first gear, a pulse is delivered from the positive terminal + through closed contact 22, contact 17 and conductor 91 to one terminal of the coil of holding relay $R_1$ of which the other terminal is grounded via conductor 95. The energization of the coil of relay $R_1$ causes the blades of reversing switches $I_e$ and $I_m$ of this relay to be attracted towards the lower contacts $C_i$ while the blades of the other relays are pushed towards the upper contacts $C_s$, the "lower" and "upper" positions mentioned herein being of course arbitrary. The contact $C_i$ of reversing switch $I_m$ of relay $R_1$ will thus connect the coil of this relay to the positive terminal +, through a circuit comprising contact $C_s$ of reversing switch $I_e$ of relay $R_{AR}$, contact $C_s$ of reversing switch $I_e$ of relay $R_3$, contact $C_s$ of reversing switch $I_m$ of relay $R_2$, conductor 96 and contact 22 of selector S. The relay $R_1$ is held in a condition of permanent energization when the selector lever resumes its inoperative position; at the same time, the energization of any other previously energized holding relay is discontinued. As the contact 100 of solenoid-operated valves E is closed and the clutch is released, the solenoid-operated valve $E_1$ is energized, its coil being connected with one end to the positive terminal through conductor 78 and the closed contact $C_i$ of reversing switch $I_e$ via conductor 78 and the closed contact $C_i$ of reversing switch $I_e$ of relay $R_1$, and with the other end to the ground via the closed contact $C_1$ of clutch safety relay $RS_1$, conductor 77 and contact 100.

The spools 59 of solenoid-operated valve $E_1$ closes the outlet port $97_s$ leading to collector duct 69 and opens the fluid supply duct $97_e$ of fluid feedline 65 which is thus caused to communicate via line 62 with the control chamber of piston 54. This piston moves the bar 29 and therefore the fork 27 and its companion hub 25 engaging the gear of the first-speed gear couple I. At the end of the stroke of bar 29 its shoulder 98 actuates the lever 99 of relay 86 and causes the movement of spool 87 to its position in which it closes the outlet port of line 65 while connecting the exhaust line to chamber 89 of piston 49. The spool 48 of distributor 44 is then pushed to the position in which the pressure fluid passage 50 communicates with duct 47, thus directing this fluid under pressure into chamber 45 of torque converter 33 while chamber 41 of clutch 40 is connected to the return line 53 leading to the reservoir. Under these conditions, the clutch transmits the drive between the torque converter and the input shaft 23 of the transmission mechanism. At the same time contact 103 is open, thus preventing any energization of the solenoid-operated valves $E_1$ and $E_3$.

The pressure-responsive switch $M_1$ of the clutch safety device D is then closed; however, the relay $RS_1$ is not energized for the other pressure-responsive switch $M_2$ is open and relay $RS_2$ is deenergized; therefore, contact $C_3$ is open. On the other hand, contact $C_1$ is closed and grounded.

When under these conditions the change to second or intermediate gear is controlled by means of a pull transmitted through selector S, by closing contact 15 to energize relay $R_2$, the energization of solenoid-operated valve $E_1$ is discontinued so that the first-gear fork 25 is disengaged, thus causing immediately the movement of spool 87 in the hydraulic relay 86 and increasing the pressure in chamber 94 of piston 49. When this pressure is as high as, say, 10 bars (145 p.s.i.), the pressure-responsive switch $M_2$ is closed, $RS_2$ is energized and closes contact $C_3$ while energizing $RS_1$. The other pressure-responsive switch $M_1$ is still closed, for the clutch release pressure is supplied by the pump 51 and there is a certain time lag with respect to the control pressure. Therefore, contact $C_1$ is opened and the energizing circuit of the solenoid-operated valve cannot be reclosed until relay $RS_1$ is deenergized, i.e. when the clutch release pressure in chamber 41 is in excess of 4.2 bars (61 p.s.i.); when this pressure is attained, $M_1$ is open, $RS_1$ deenergized and contact $C_1$ regrounded.

Under these conditions the current can flow through the coil of the solenoid-operated valve $E_2$ controlling the corresponding fork 28 which, at the end of its stroke, restores the spool 87 of relay 86 in its exhaust position, thus permitting the pressure drop in chamber 89 of piston 49. Pressure-responsive switch $M_2$ is reopened, relay $RS_2$ is deenergized, the clutch release pressure drops likewise and when contact $M_1$ is reclosed relay $RS_1$ cannot be energized again since contact $C_3$ is open; therefore, contact $C_1$ remains grounded.

On the other hand, if a pulse corresponding to the preceding condition is produced through the selector S, this control action will have no consequence whatsoever.

Other forms of embodiment of this invention may be contemplated by those skilled in the art without departing from the basic principles of this invention, as set forth in the appended claims. Thus, relays of a type other than the electromagnetic one illustrated in this example may be used, such as electronic relays. The control system of this invention may be adapted to transmission mechanisms other than the particular one shown and described herein, for instance to mechanism providing a lower or higher number of gear ratios, or mechanisms associated with a clutch controlled by means other than hydraulic means.

I claim:

1. A pulse control system applicable to a change-speed transmission mechanism having a fluid-controlled clutch with a clutch safety device, relay means actuating in turn members adapted to control a gear-change servomechanism of said transmission, said control system comprising a case, a control lever in said case having a piston, a selector lever, a cylinder at one end of said selector lever in which is slidably fitted said piston, a spring in said cylinder against whose resistance said piston is movable axially, an annular bead at the free end of said selector lever, said levers being mounted to tilt together, contact means disposed in at least one transverse plane perpendicular to the longitudinal axis of said levers, said contact means being diametrically opposed to by two in said case to be actuated by said selector lever bead when tilted for closing circuits for the delivery of control pulses for energizing said relay means, a neutral contact means actuated by the axial sliding movement of said control lever when pushed down axially, a rod on said control lever piston sliding in said selector lever to open said neutral contact means, said case having a shoulder, said selector lever having a flange, a second spring in said case constantly urging said flange against said shoulder, said second spring also constantly urging said selector lever to an inoperative position of equilibrium.

2. A pulse control system according to claim 1, wherein said contact means are radially pushed front contacts, one at least of these contact means being adapted to deliver pulses to the relay actuating said transmission control means for providing the reverse speeds, the other contact means being adapted to deliver pulses to the relays controlling the forward speeds of said transmission.

3. A pulse control system according to claim 2, wherein said reverse control contact means is shifted axially in relation to the plane containing said forward speed control contact means.

4. A pulse control system according to claim 2, wherein one of said control and selector levers carries a transverse pin and said case carries a projection shifted longitudinally in relation to said contact means controlling the reverse ratio and diametrically opposed to this contact, said pin registering with said projection in the inoperative position of the lever.

5. A pulse control system according to claim 1, wherein said neutral contact means is a back contact enabled to cut the general neutral circuit of said relays and is disposed at the bottom of said case.

6. A pulse control system according to claim 1, wherein said contact means cooperating with said selector lever are connected to relays of the safety device controlling said clutch, said relays being inserted in the energizing circuit of members controlling said gear-change servomechanisms.

* * * * *